Jan. 4, 1949.   M. R. HUTCHISON, JR   2,458,382
SHOCK TESTING
Filed Feb. 14, 1946
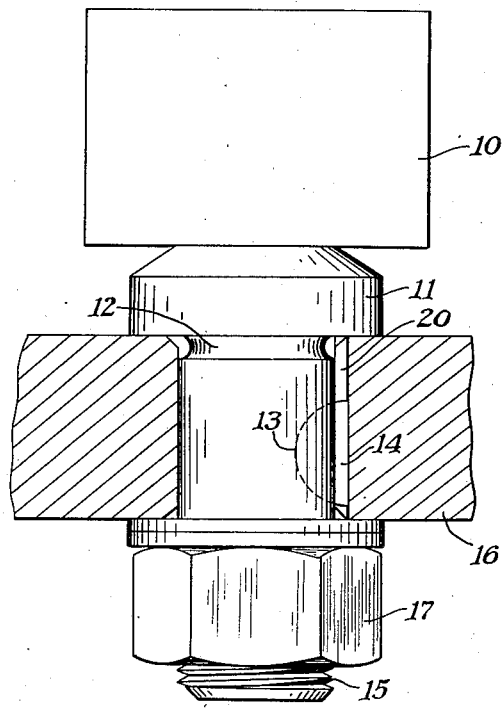
MILLER R. HUTCHISON. JR.
INVENTOR
BY
ATT'Y & AG'T Patented Jan. 4, 1949

2,458,382

UNITED STATES PATENT OFFICE 2,458,382

SHOCK TESTING

Miller R. Hutchison, Jr., Rochester, N. Y., assignor to Eastman Kodak Company, Rochester, N. Y., a corporation of New Jersey Application February 14, 1946, Serial No. 647,586

2 Claims. (Cl. 73—12)

The present invention relates to testing the ability of natural or manufactured articles to withstand shock.

It relates particularly to methods for testing the ability to withstand a high degree of shock similar to that experienced when an article falls from a great height or is fired from a gun. The ability of a mechanism to withstand impact is ordinarily determined by preforming a drop test or by using a ballistic pendulum or the like. Such methods always involve a certain degree of doubt as to whether the object has been struck squarely and as to what part of the energy of the blow has been dissipated in the form of heat, permanent deformation, etc. It is also difficult to make measurements of deflections or observations of damage when the object being tested is in motion prior to the delivery of the blow, i. e. when the object is dropping.

The purpose of the present invention is to provide a method of subjecting an object to a determinable acceleration which may be of any desired magnitude, twenty thousand times that of gravity for example, with the object initially motionless and squarely seated upon the supporting surface.

The apparatus used in the present invention is similar to that employed in testing the rupture strength or tensile strength of metals and the like. It is not identical to such machines however, since provision must be made for supporting the object to be tested. According to the invention the ability of an object to withstand impact is tested by placing a metal rod of known tensile strength in a substantially vertical tensioning device with the upper end of the rod forming a substantially horizontal table. The object to be tested is then placed on the table and tension on the rod is gradually increased until the rod ruptures. Preferably the rod is in the form of a flat head bolt having a neck portion of predetermined diameter less than the rest of the bolt. This bolt is seated loosely through a hole in a metal plate, the head engaging the upper surface of the plate and a nut, preferably with washers, engaging the lower surface of the plate. Tensioning is applied gradually tightening the nut on the lower end of the bolt tending to squeeze the metal plate.

The bolt ruptures through the neck portion and the force required to produce this rupture is proportional to the area of the section and the material strength of the bolt. When the bolt ruptures a force of like magnitude suddenly is applied to the parts above the plane of rupture due to the energy resiliently stored in the supporting plate and the bolt head which behave like a spring of very high rate. For example, to develop an acceleration of 20,000 g upon an object having a weight of two pounds, a bolt is employed of such dimensions and material as to break under a tensile load of approximately 60,000 pounds of which ⅓ is to provide the acceleration of the mass of the bolt head and locally displaced material of the supporting plate. The supporting plate may be of one inch thickness steel and the load intensity under the bolt head about 25,000 pounds per square inch. Thus the total linear deflection produced by the 60,000 pound bolt load will not exceed .002 inch. When the bolt breaks, the piece under observation will be catapulted vertically upward about 18 inches. Convenience may be served by more or less rise and the system can be made to accommodate a wide range of requirements. The object to be tested may be anything which is liable to be subjected to considerable shock, such as a meter or a camera to be placed on a vehicle, a machine or a piece of ordnance, or part of a gun or even part of a shell which is to be fired from a gun.

The accompanying drawing illustrates a preferred simple embodiment of the invention.

In the drawing an object 10 to be tested is placed on the horizontal upper surface of a bolt 11 which extends loosely through a hole 20 in a metal plate 16. The bolt is so shaped as to include a neck portion 12 of reduced diameter which insures that under tensioning, it is always the neck which ruptures. By proper choice of material and by shaping the neck toroidal as shown to a specified diameter, one is able always to obtain a standard shock or impact. Alternatively one could use a tensioning device in which the load is continuously indicated or at least which indicates the load at the moment of rupture. It is still preferable, however, to use a rod of known rupture strength in order to insure that the test is repeatable.

The lower end of the bolt 15 is screw threaded and tension is applied by tightening a nut 17 thereon in a manner tending to squeeze the metal plate 16 and to deform the head 11 of the bolt. The bolt is provided with a keyway 13 which engages a key 14 so that the bolt itself is prevented from turning. The simplest form of the invention employs a supply of bolts of one standard rupture strength or of a series of known rupture strengths. More elaborate forms are provided with means for measuring the tension load as in any standard strength testing instrument.

When a tension measuring device is used the uniformity of the rods is not so critical, since one merely ignores the results of tests in which rupture occurs at the wrong tension value. However, the preferred embodiment of the invention eliminates the need for elaborate equipment by using a large number of bolts of substantially equal known strength. For example, 1000 bolts, carefully made of identical materials, identically heat treated and identically machined are spot tested and found, for 100 of them say, to have rupture strengths within 1 or 2% of each other. The other 900 can be used for the present invention. It is absolutely essential therefore in this embodiment of the invention to have a plurality of standard rods.

I claim:

1. The method of testing the ability of an object to withstand shock which comprises placing a metal rod of known tensile strength in a substantially vertical tensioning device with the upper end of the rod forming a substantially horizontal table, placing the object on the table and gradually increasing the tension on the rod until it ruptures.

2. The method according to claim 1 in which the rod is in the form of a flat head bolt having a neck portion of predetermined diameter less than the rest of the bolt, the bolt extending through a hole in a thick metal plate the upper surface of which is engaged by the head of the bolt, and the lower surface of which is engaged by tightening means used to apply the tension gradually by tightening in a manner tending to squeeze the metal plate.

MILLER R. HUTCHISON, JR.

REFERENCES CITED

The following references are of record in the file of this patent:

UNITED STATES PATENTS

| Number | Name | Date |
| --- | --- | --- |
| 120,577 | Farrel | Nov. 7, 1871 |
| 2,083,054 | Cline | June 8, 1937 |
| 2,412,860 | Baudry | Dec. 17, 1946 |